United States Patent
Bryant et al.

(10) Patent No.: US 9,348,905 B2
(45) Date of Patent: May 24, 2016

(54) SYSTEM, METHOD AND NETWORK DEVICE FOR STREAMING DATA FROM A NETWORK

(71) Applicant: Earbits, Inc., Venice, CA (US)

(72) Inventors: Benjamin Bryant, Beverly Hills, CA (US); Joey Flores, Venice, CA (US); Christopher Gooley, San Francisco, CA (US); Yotam Rosenbaum, Venice, CA (US)

(73) Assignee: YOU42 RADIO, INC., Cumming, GA (US)

(*) Notice: Subject to any disclaimer, the term of this patent is extended or adjusted under 35 U.S.C. 154(b) by 152 days.

(21) Appl. No.: 14/256,913

(22) Filed: Apr. 18, 2014

(65) Prior Publication Data
US 2015/0302085 A1    Oct. 22, 2015

(51) Int. Cl.
G06F 17/30    (2006.01)
H04L 29/06    (2006.01)
H04L 29/08    (2006.01)

(52) U.S. Cl.
CPC .......... G06F 17/30743 (2013.01); H04L 65/60 (2013.01); H04L 67/2842 (2013.01)

(58) Field of Classification Search
CPC ............... G06F 17/3074–17/30778; H04L 65/1023–65/60; H04L 67/2842
See application file for complete search history.

(56) References Cited

U.S. PATENT DOCUMENTS

| 8,219,536 | B2* | 7/2012 | Wohlert | G06F 17/30029 707/694 |
| 2008/0147739 | A1* | 6/2008 | Cardamore | G06F 17/30017 |
| 2008/0208823 | A1* | 8/2008 | Hicken | G06F 17/30743 |
| 2010/0010997 | A1* | 1/2010 | Amidon | G06F 17/30038 707/E17.002 |
| 2010/0070490 | A1* | 3/2010 | Amidon | G06F 17/3002 707/722 |
| 2010/0169493 | A1 | 7/2010 | Yamakawa et al. | |
| 2011/0066633 | A1* | 3/2011 | Naftolin | G06F 17/30053 707/769 |
| 2014/0115463 | A1* | 4/2014 | Reznor | H04M 1/72558 715/716 |
| 2015/0195264 | A1* | 7/2015 | Finlayson | G06F 21/32 726/6 |

FOREIGN PATENT DOCUMENTS

EP        1364513      11/2003
WO    WO 00 52934 A1   9/2000

* cited by examiner

Primary Examiner — Nicholas Taylor
Assistant Examiner — Clayton R Williams
(74) Attorney, Agent, or Firm — Cherskov Flaynik & Gurda, LLC

(57) ABSTRACT

A system, method and a network device for streaming data from a network are provided. A network device includes a software application for streaming network data. The application sets a ratio of local versus network content to a value. The application scans the network device's local media library metadata for local content and submits the metadata to the network server, wherein the server uses the metadata to identify and classify local content and create an integrated playlist using local and network content that is communicated to the network device, which starts content playback. In the event of no network connectivity, the content playback may be based entirely on locally stored content. The selection of local or network content is based on a randomly generated value and a set ratio of local to network content.

11 Claims, 6 Drawing Sheets

SYSTEM, METHOD AND NETWORK DEVICE FOR STREAMING DATA FROM A NETWORK

BACKGROUND OF THE INVENTION

1. Field of the Invention

The present invention generally relates to system, method and network device for streaming data from a network and to switching from streaming content to local content in order to reduce data usage, streaming costs, and royalty and licensing costs.

2. Background of the Invention

With the advent and improvement of the Internet, customers are now able to receive data, including music, from one or more servers to their network devices, including their wireless phones, tablets, laptops, desktops and other network devices. The reception of music or other data to network devices, where the music is not permanently downloaded and stored onto the local storage of the network device is referred to as "streaming." For wireless devices, such streaming occurs through the use of cellular networks or WiFi with associated cellular plan or WiFi costs from cell, cable or Internet service providers. Many cellular data plans and data plans offered by Internet service providers have monthly data limits, which affect even "wired" network devices (e.g., computers connected to an Internet router via Ethernet cables). Unlimited data plans or plans with high data limits increase in cost and are not available in certain areas or through certain providers. A need in the art exists to lower the amount of data streamed over networks, thereby lowering data streaming costs for consumers.

In addition, the music streaming industry has royalty costs associated with streaming of music. Subscription streaming services often pass those costs to the consumers in the subscription fees or through advertising (which increases data usage by consumers and results in additional costs to companies providing such advertising). A need in the art exists to lower royalty costs associated with streaming of music.

The present invention addresses and solves problems of data streaming to network devices by providing a system and method of switching between streaming content and local content. In addition to decreasing network data usage and costs associated therewith, another benefit of the system and method of the present invention is to give the option to the consumers to manage their data usage and allow them the option of playing their own music based on their personal preferences, location (e.g., little to no network availability), familiarity (e.g., providing users with familiar content mixed with new music), and to allow uninterrupted playing of music by substituting local content for which a streaming service lacks licenses or needs to reduce royalty obligations.

The art describes certain systems and methods of streaming music or other data from network servers onto network devices, including a method of switching from streaming content to local content (e.g., U.S. Pa. App. 20100169493 A1—"the '493 application"—the entirely of which is expressly incorporated herein by reference). However, the art deals with switching to local content only when a network interruption is detected and does not provide for methods to switch between network data and local data for other reasons or to reduce data usage or streaming costs by providing a method and system of switching between local and network content. Thus, for example, the '493 application describes a method of receiving a music stream from a server, emitting music from the music stream, and playing a locally stored content, when a network interruption is detected. The described method switches to network streaming when a "network connection is re-established." The application provides a possible solution to consumers in times of "losses in connectivity" and "network disruptions" and selects locally stored songs based on the loss of network connectivity and on criteria such as whether a particular selection is a "user favorite song, the same artist song, the same genre song" or "a random song" from information obtained from the local playlist. The '493 application does not provide for a system or method of switching between network content and local content when network connectivity is not lost—i.e., for reasons other than loss of connectivity and network disruptions.

Other art describes methods for customizing broadcasted network content based on user criteria and local content but does not provide for a system or method of switching between network content and local content in order to reduce data streaming and royalty costs. (See, e.g., WO 2000052934 A1). Additional art contemplates the reduction of the bandwidth necessary for content streaming and improvement of the quality of experience for the user of streamed content by substituting higher quality local content for lower quality broadcasts. (See, e.g., EP 1364513 A2). Such a system substitutes identical local content for broadcasted content (e.g., using a locally stored song instead of the same streamed song). This art does not, however, disclose switching between network content and local content based on multiple parameters, such as user choice.

Therefore, a need exists in the art for a system and method for controlled switching from network content to local content in order to reduce streaming and royalty costs and allow consumers to select between network content and local content based on their data plans, location, and personal preference (in situations where a user is streaming new and unfamiliar music).

SUMMARY OF INVENTION

An object of the invention is to provide a system and method of switching between network content and local content in order to reduce streaming and royalty costs. By switching to local content, users are allowed to play a wider selection of music that may not be available on a music streaming service. The use of the local content reduces data streaming costs, supplements streaming catalogs, reduces license and royalty fees paid by music streaming companies, and provides users with comfort and familiarity when engaging in streaming of new content. Thus, the invention is especially useful for streaming of relatively unknown, novel, and independent artists whose works are not widely distributed.

Another object of the invention is to automatically classify local content into existing playlists and/or channels in order to facilitate a seamless switching between network and local content. A feature of the invention is the interplay between the network device (e.g., smartphone, tablet or personal computer) and the network server(s). Thus, a system and method of switching between network and local content may be implemented with a software application installed on a network device, wherein, at the initial startup, the application scans the network device's local media library for local content; the ratio of network content versus local content is set; the application identifies local content; the application scans local content metadata and submits it to the network server; the network server uses the received metadata to identify and classify local content; the application on the device (with instructions from the server) creates an integrated playlist using local and network content; the application starts content playback. In the event of no network connectivity, the content playback may be based entirely on locally stored content.

Furthermore, the ratio of network content versus local content may be set or changed at any time and independent of the application's actions.

In one embodiment, during subsequent startups of the application on a network device, the application starts playback based on previous sessions' settings; the application scans for new local content; the application collects metadata for new local content and submits it to the network server; the server uses the received metadata to identify and classify local content; the application updates an integrated playlist using local and network content; the application continues playback using the updated integrated playlist. When the network versus local content ratio is updated, the application updates the integrated playlist using local and network content and continues playback considering the parameters of the new ratio. In another embodiment, the application comprises a background service that monitors local network device media files.

In another embodiment of the invention, a music streaming software application on a mobile device starts; the application identifies local content; the application allows for streamed content versus local content ratio to be set; the application scans for local content metadata; the scan of the local content metadata is stored to file and submitted to the network server; the network server reads/parses the file; the server matches artists against cached database (DB); if matched artists are found, the server retrieves music genre; the server generates artists to genre mapping file; the mobile device creates/displays channel recommendations based on the genre mapping file from the network server; a recommended channel may be set on the application; the application starts content playback. In the same method as above, following the step of the server matching artists against cached database, if matched artists are not found, then the server checks a $3^{rd}$ party database. If matches are not found on the $3^{rd}$ party database, this artist is ignored. If matches are found on the $3^{rd}$ party database, the network server's database is updated; the server generates artists to genre mapping file; the mobile device creates/displays channel recommendations based on the genre mapping file from the network server; a recommended channel may be set on the application; the application starts content playback. This method is especially useful in reducing license and royalty fees paid by music streaming services.

In the present invention, the ratio of local content versus network content may be set and changed at any time depending on data usage limits, network connectivity and personal preferences. For example, the ratio may be set to a decimal value between 0 and 1, with a value closer to 0 favoring local content and a value closer to 1 favoring network content.

Throughout this disclosure, frequent references to streaming of music are made. Nevertheless, this invention should not be perceived as being limited to music and may be applicable to any streaming data service where local content may be switched for network content. Such data services may include but not be limited to audio books, podcasts, photo and video services, news services, talk shows, and comedy streaming services.

Other advantages and novel features will become apparent from the following detailed description when considered in conjunction with the drawings and the disclosed versions are intended to include all such aspects and their equivalents.

BRIEF DESCRIPTION OF THE DRAWINGS

The invention together with the above and other objects and advantages will be best understood from the following detailed description of various embodiments of the invention shown in the accompanying figures. In the figures, like reference numerals and nomenclature refer to like parts throughout the various views unless otherwise indicated.

DETAILED DESCRIPTION OF THE INVENTION

Figure 1:
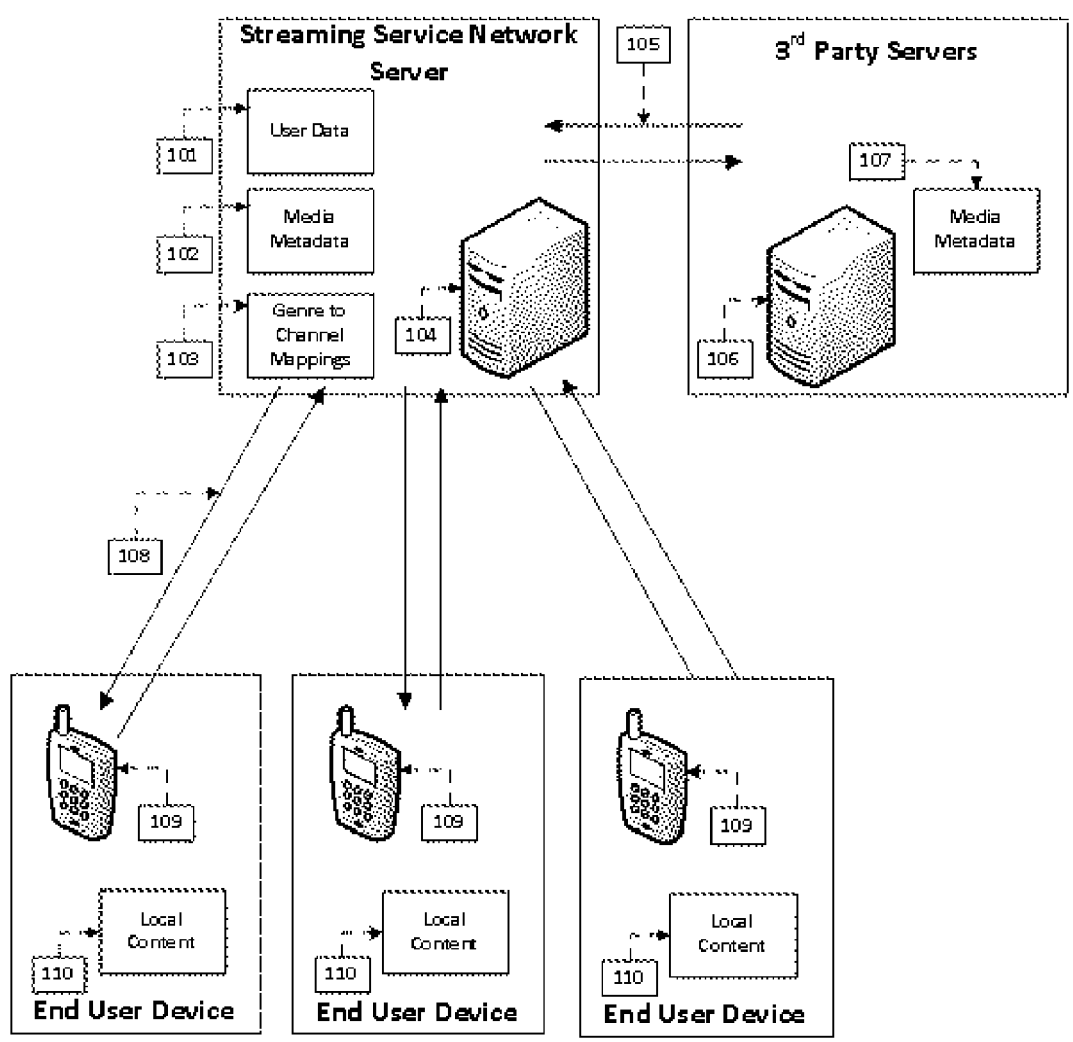
FIG. 1 is a diagram of the end-user network device integrated with a network server and a possible $3^{rd}$ party network server, according to an aspect of the invention.

The foregoing summary, as well as the following detailed description of certain embodiments of the present invention and the enclosed figures set forth in detail certain exemplary aspects and are indicative of but a few of the various ways in which the principles of the present invention may be employed.

To the extent that the figures illustrate diagrams of the functional blocks of various embodiments, the functional blocks are not necessarily indicative of the division between hardware circuitry. Thus, for example, one or more of the functional blocks (e.g. mobile devices, databases, processors or memories) may be implemented in a single piece of hardware (e.g. a general purpose signal processor or a block of random access memory, hard disk or the like). Similarly, the programs may be stand-alone programs, may be incorporated as subroutines in an operating system, may be functions in an installed software package, and the like. It should be understood that the various embodiments are not limited to the arrangements and instrumentality shown in the drawings and tables.

With reference to FIG. 1, the present invention broadly encompasses an end-user device ("network device") 109 such as a mobile smartphone (iOS or Android or other), a tablet (iOS or Android or other), or a personal computer such as a laptop or desktop capable of being connected to a network 108, such as to the Internet, or a local area network. The network device 109 may contain local content 110 and may be connected to a streaming service network server(s) ("network server" or "first network server" or "streaming server") 104 wired or wirelessly. As contemplated herein, the network server 104 is typically a server configured to provide a data streaming service ("streaming service") such as a music streaming service. The streaming server 104 is a typical data server capable of being connected to a network and storing and processing data. Amongst its different functions, a streaming server 104 contains two-way communication network connection, other than the streaming service and processes user data 101 and media metadata 102 and generates genre to channel mappings 103. In a particular embodiment of the present invention, the streaming service transmits or streams music to network devices 109 in communication with the streaming service. In other embodiments, streaming of audio books, comedy, video, other data or a mixture of several data types is contemplated. The streaming server 104 may be connected through a network 105 to other servers 106 (including 3$^{rd}$ party servers) containing additional media metadata 107, such as music of independent artists. The 3$^{rd}$ party servers 106 may be typical data servers or personal computers. The streaming servers 104 may contain and process service user data 101, music media metadata 102, and provide genre to channel mappings 103. The 3$^{rd}$ party servers 106 may provide additional media metadata 107 not already located on the streaming servers 104.

Figure 2:
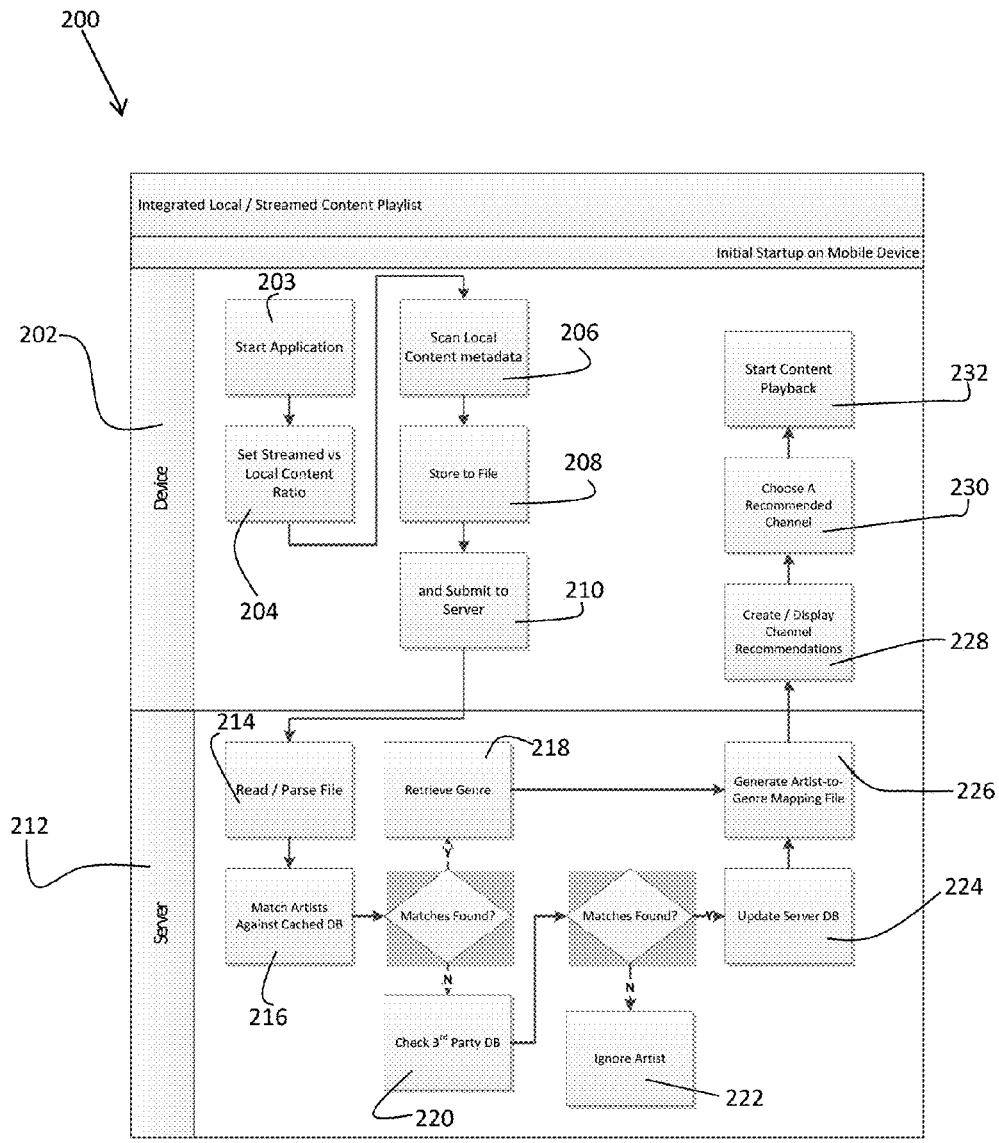
FIG. 2 is a diagram of an integrated local and network/streamed content playlist generation on a user's mobile device following an initial startup of the mobile device according to a particular embodiment of the invention.

With reference to FIG. 2, a software application ("application") is installed on a network device 109 ("device") in communication with at least one network server 104. In one embodiment, in order to install the application on the device, the end user must download the application from a centralized software distribution service. At the time the application is downloaded, the application is also provided with a list of network servers.

When the application is launched for the first time on a network device, a connection to a network server is verified and a ratio of streamed/network content versus local content is determined and set. In one embodiment, the application automatically begins scanning the local content metadata on the network device. The application scans the metadata from the local media library and stores the metadata in a local metadata file. The network device then submits the local metadata file to the streaming server. The server reads and parses the file and then matches metadata by at least one metadata category, such as artist (or another selected attribute such as, for example, music genre or music albums) against the cached artist mapping database on the server. If an artist match is found, the corresponding genre is retrieved and stored in a file on the server. If an artist match is not found, the server contacts a 3$^{rd}$ party database server to check for matches. If an artist match is made on the 3$^{rd}$ party database, then the artist/genre metadata is updated to the streaming server database metadata cache. This process is repeated until all of the metadata from the device's local library has been processed. Once the artist/genre mapping file is created (e.g., screenshot in FIG. 6), the streaming server returns the information to the network device. The device reads and stores the artist/genre mapping file and calculates the frequency with which different genres appear in the local existing media library. Based on these calculations and an existing genre/channel mapping file, the device recommends channels to the user. In one embodiment, once the scanning of the network device is complete, the application initiates media playback, while in another embodiment, the scan tasks occur in the background. Once media playback has been initiated, the network device selects a song matching the appropriate genre, selecting either a local song (or other local content) or a streamed song (or other network content) based on the previously set ratio of local to network content. In the case that network connectivity is lost, the application will default media assets from the local media library that match the channel criteria.

In one embodiment, the local media library is stored on computer-readable medium connected locally to the network device, such as local persistent storage media. In another embodiment, the local media library is stored on computer-readable medium accessible by the network device, such as cloud storage assigned to the particular network device. While the computer-readable medium is not physically attached to the network device, in this embodiment, it is nonetheless logically assigned to the device, and the device has reliable access to same. The storage and the content accessible to the network device are accessible to the network device for direct playback.

In one embodiment, the network device, as part of its scanning of local content, ensures that the local content is authorized for playback by the network device. In this embodiment, the metadata attached to each media library entry includes one or more digital rights management entries or files, and the network device ensures that the content is licensed for playback prior to processing the library. In another embodiment, the network device communicates with an external licensing source to ensure that the local content is licensed for playback. By referring to an external licensing source, the local media library can be verified for license compliance at the same time the metadata local file is compiled.

Figure 3:
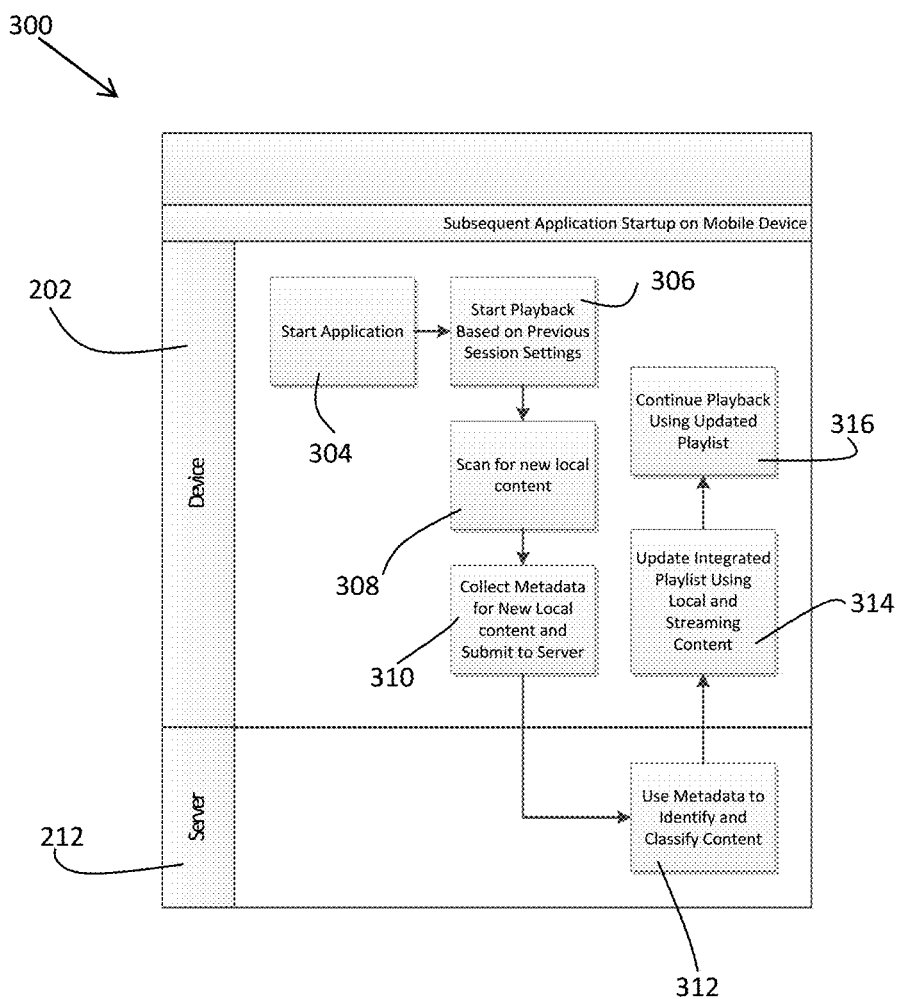
FIG. 3 is a diagram of an integrated local and network/streamed content playlist generation on a user's mobile device following a subsequent startup of the mobile device according to a particular embodiment of the invention.

With reference to FIGS. 2 and 3, a music streaming software application on a network device such as a mobile device is first activated. The application automatically begins scanning the local media library on the network device to identify the local content media metadata. The scan of the local content metadata is stored in file and submitted to the network server. The network server reads and parses the file and then matches artists against a cached database stored on the network server. If matched artists are found, the server retrieves music genre for those artists and generates artists to genre mapping file. The server communicates this information to the network device, which creates and displays channel recommendations based on the genre mapping file from the network server. A recommended channel based on the genre mapping file is set on the application on the basis of user listening history, user rankings, or other network device specific information not shared with the server. The application begins content playback. In the same method as above, following the step of the server matching artists against cached database, if matched artists are not found, then the server checks a 3$^{rd}$ party database. If matches are not found on the 3$^{rd}$ party database, then the un-matched artist is ignored, in one embodiment. In another embodiment, the un-matched artist music is analyzed to determine if objective measurements of the music (such as volume, tempo, presence of vocals, instruments involved) match signatures of music in one or more music genre. If such a match is made, the network device suggests the general match to the end user. If matches are found on the 3$^{rd}$ party database, the network server's database is updated, and the server generates artists to genre mapping file. The server communicates the genre information to the network device, which creates and displays channel recommendations based on the genre mapping file from the network server. A recommended channel based on the genre mapping file may be set on the application, following input from the network device user, in one embodiment. The application then starts content playback, in one embodiment, while in another embodiment, the playback begins to a default channel selection without user input.

With reference to FIG. 3, during subsequent startups of the application on a network device such as a mobile device, the application starts playback based on previous sessions' settings. The application scans for new local content, collects metadata for new local content and submits it to the network server. The server uses the received metadata to identify and classify local content and update an integrated playlist, which is then transmitted to the device. The application continues playback using the updated integrated playlist. When the network versus local content ratio is updated, the application updates the integrated playlist using local and network content and continues playback using the parameters of the new ratio.

For music streaming services, the music streaming server keeps a client side (device or end-user) database of artist names mapped to the particular streaming server channels the artists should mix into. This database is updated after the music service's application is launched using artists found on the mobile device's local tracks. The artist names are then sent to the streaming server, which, in response, provides channel mappings to the user device. When the application needs to queue a track for a channel, the track may be either local or from a network depending on the "discovery" ratio (ratio of local versus network content discussed throughout this disclosure—see, e.g., screenshot in FIG. 5). Upon network service interruptions, the application will randomly select a local track that is mapped to the station. The application then checks if a particular artist has been played recently and restart the queue process if it has.

Figure 6:
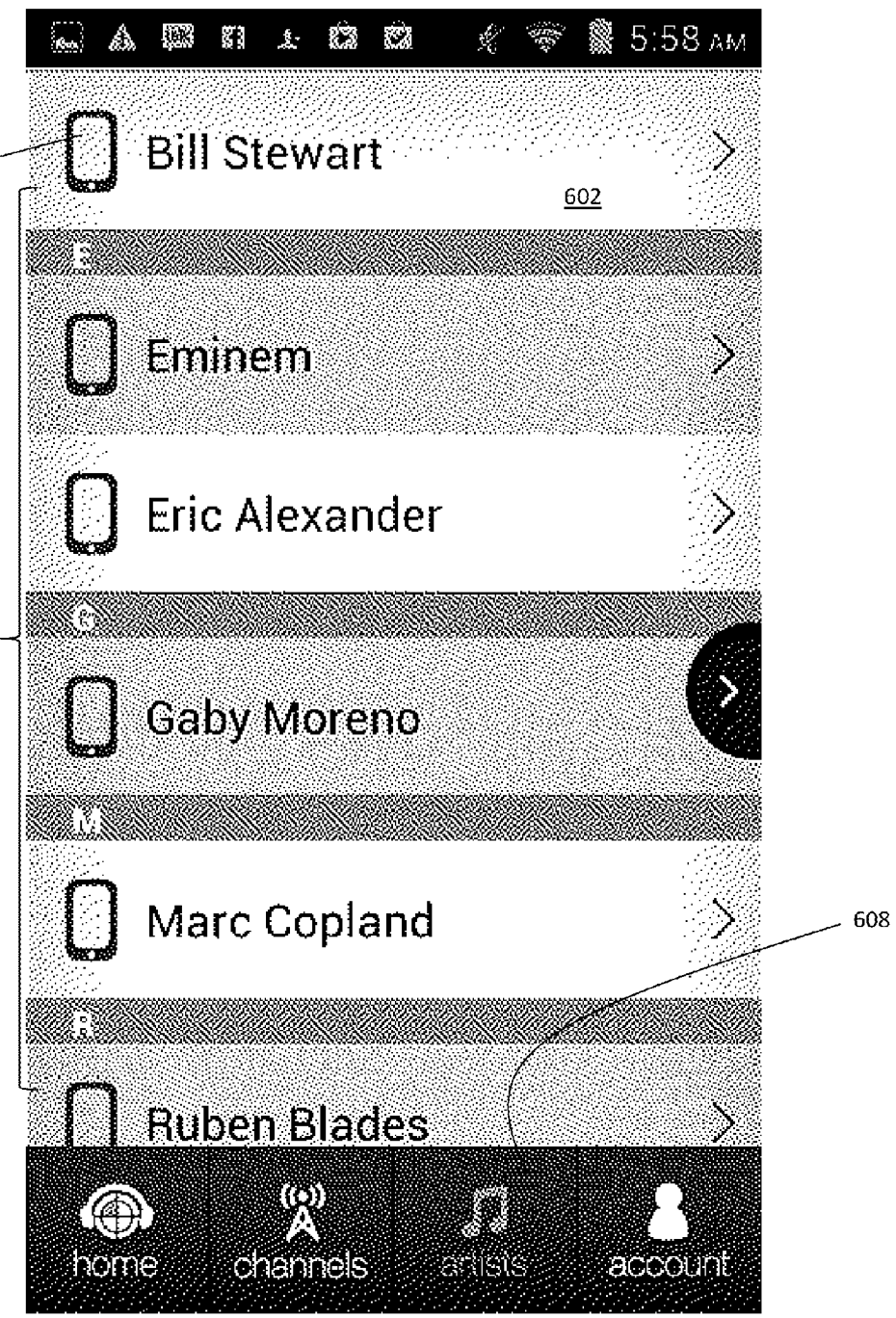
FIG. 6 is a screenshot of a software application depicting an integrated playlist of local and network content (artist/genre mapping file), according to an embodiment of the present invention.

In one embodiment, the selection of a local or streamed song is based on a randomly generated number a defined ratio. In a particular embodiment, the randomly generated number is, for example, between 1 and 100 (although any random value between any sets of parameters is acceptable), and a defined ratio is set to a decimal value between 0 and 1 (although any value between any sets of parameters may be acceptable) for local versus streamed playback. Local tracks matched to the channel by analysis are selected completely randomly. The ratio of local content versus network content may be set and changed at any time depending on a number of factors, including data usage limits, network connectivity, location of the network device, whether the network device is on a home network or on a roaming network, and personal preferences. The set ratio for choosing local versus network content is set to a decimal value between 0 and 1, with a value closer to 0 favoring local content and a value closer to 1 favoring network content, in one embodiment. As such, in one embodiment, when the application detects that a connection to the network server 104 has been lost, the ration will be set to 0. Further, if the application detects that the network device 109 is at a location with a strong data signal and a WIFI connection, the ratio will be set close to 1, for example 0.80. In another embodiment, the ratio may be set in accordance with a user's preferences and not in accordance with network connectivity. Thus, for example, even in an area of good reception or when on a home or a WIFI network, the ratio may still favor local over network content. It should be further understood that although in this example a decimal value of between 0 and 1 is used, this ratio may be set to any value between any set of numbers or other parameters. A visual representation of a ratio set to approximately 50/50 is depicted in FIG. 6.

In one embodiment, prior to playing local content, the application verifies the song's content, beyond collecting the metadata. In one embodiment, prior to playing a local copy of a song, the application calculates a hash value or checksum value of each local copy to ensure that the media file matches to the content from the streaming server. In another embodiment, the application verifies that the encoding quality of the local copy is not perceivably worse than the quality of the streamed music. In this embodiment, prior to relying on a local copy, the application ensures that the playback experience for the user will be uniform, with the same quality of music regardless of whether the local copy or the streamed copy is used.

The following lines of software code (with the specific example being for an Android device) describe how the ratio between local and network content may be set: val local=random.nextDouble>app.getDiscoveryLevel, where app.getDiscoveryLevel may be set to a decimal value between 0 and 1 (or another suitable parameter) and random.nextDouble returns a random decimal values between 0 and 1 (or another suitable parameter). A further example of software code that determines whether the application will play or local or network content is shown in Table 1. This section of code also describes methods for selecting the local or network content from the available collection and adding it to the queue. The lines of software code described in this application are merely exemplary. Other similarly suitable commands may be utilized to achieve the same result.

Figure 4:
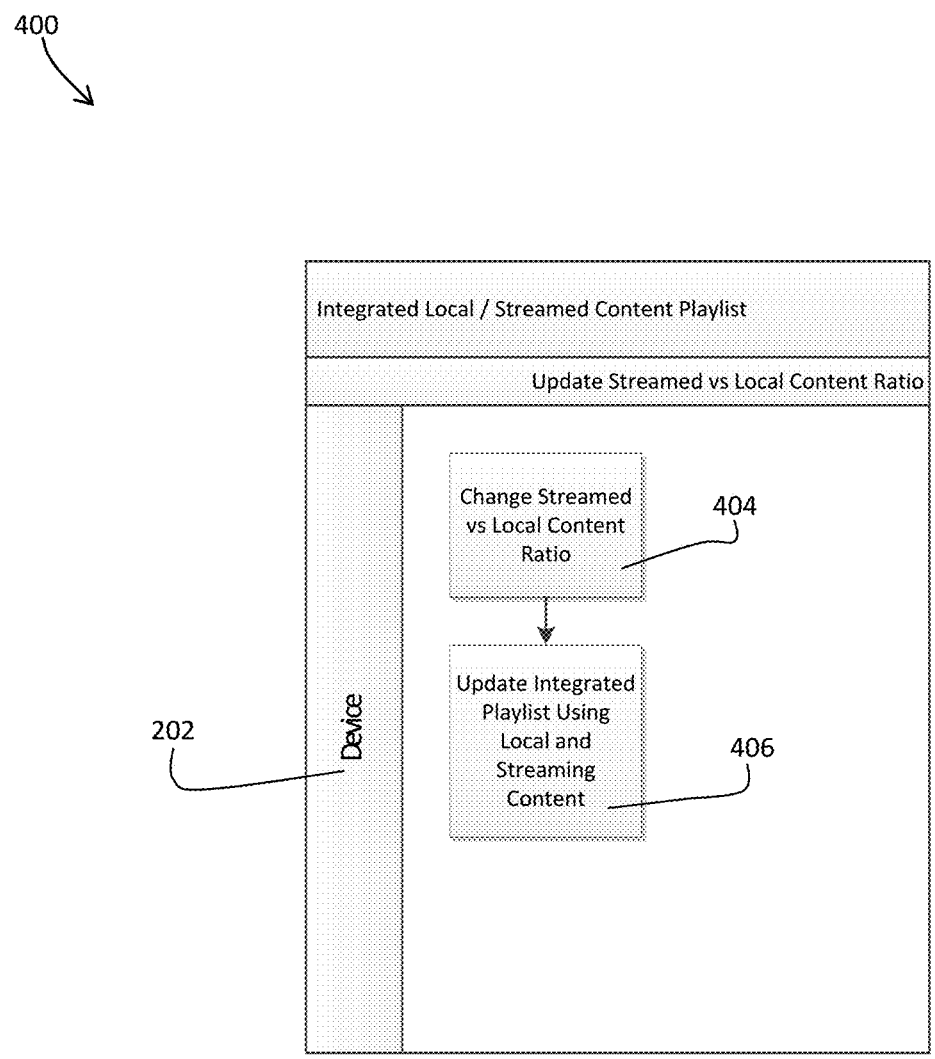
FIG. 4 is a diagram of an integrated local and network/streamed content playlist generation on a user's mobile device following an update of the network/streamed content versus local content ratio according to a particular embodiment of the invention.
Figure 5:
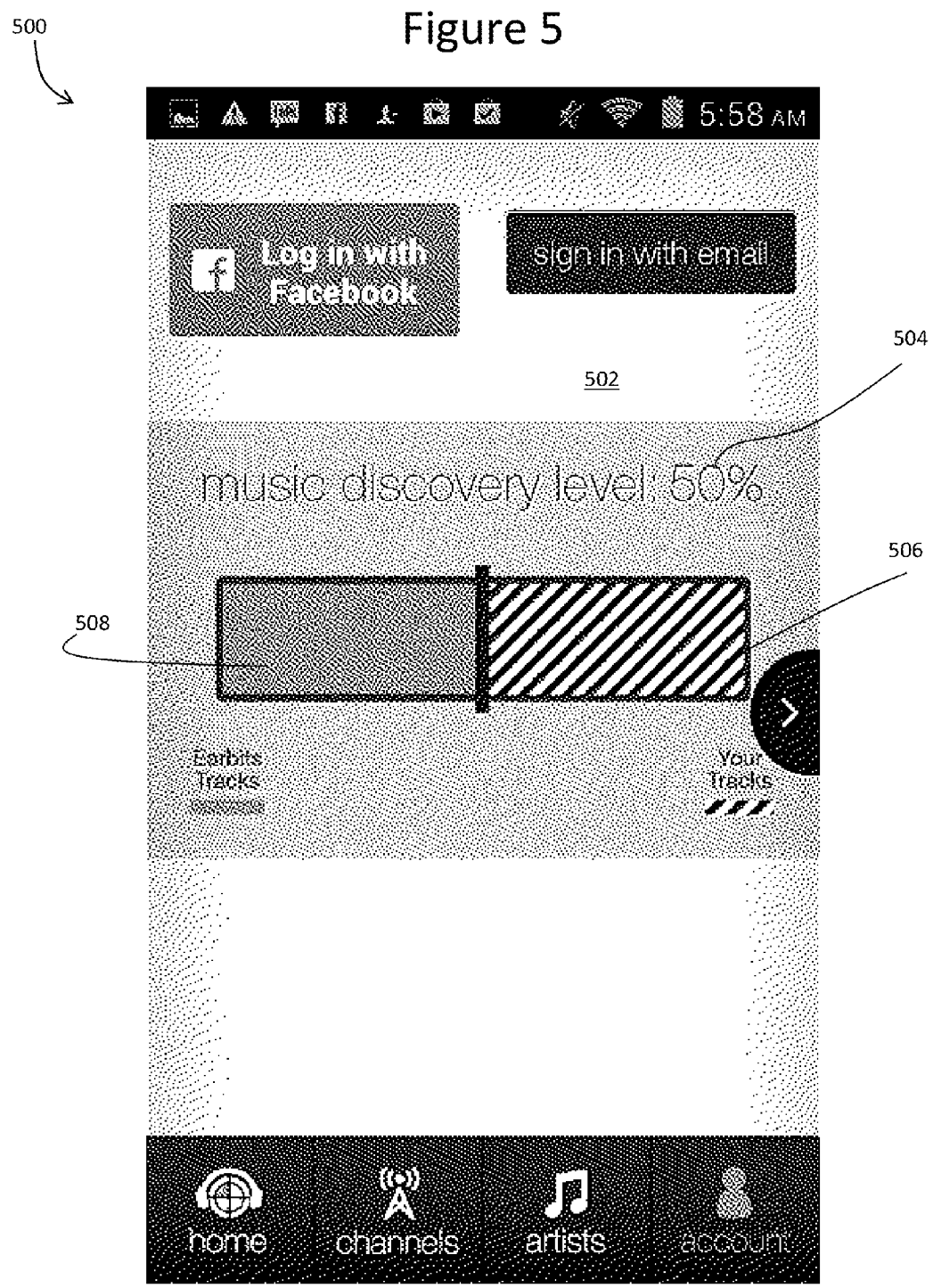
FIG. 5 is a screenshot of a software application depicting a ratio of local content versus network content, according to an embodiment of the present invention.

FIG. 2 depicts the initial startup on mobile device 200 in one embodiment. The device 202 starts the application 203. The Ratio of Streamed versus Local Content 204 is set. The local content metadata is scanned 206, stored to file 208, and submitted to server 210. The server 212 in turn reads and parses 214 file and matches the artists against the cached database 216. If matches are found the genre information is retrieved 218. If no matches are found, a third party database is checked 220. If no matches are found in the third party database, the artist is ignored 222. If matches are found in the third party database, the server datastore is updated 224. With the matches made either locally or on the server, a mapping of artist to genre is provided 226 to the device 202. The device 202 creates or displays channel recommendations 228. Thereafter the device 202 chooses a recommended channel 230 and begins playback 232. FIG. 3 depicts subsequent application startup 300 on mobile device. The mobile device 202 starts up the application 304. The playback is started based on previous session settings 306. The device 202 is scanned for new local content 308. Metadata for any new local content is collected and submitted to the server 310. The server 212 uses the metadata to identify and classify content 312. The device 202 thereafter updates the integrated playlist using the local and streaming content 314 and continues playback using the updated playlist 316. FIG. 4 depicts the process of updating streamed versus local content ratio 400 on the device 202. The process starts with a change in the streamed versus local content ratio 404. The integrated playlist is updated using local and streaming content 406. FIG. 5 a screenshot 500 of a software application 502 depicting a ratio 504 of local content 506 versus network content 508, according to an embodiment of the present invention. FIG. 6 is a screenshot 600 of a software application 602 depicting an integrated playlist 604 of local 606 and network content (artist 608/genre mapping file), according to an embodiment of the present invention.

TABLE 1

Determining Local Or Networked Content

```
// queues the next track if possible
// called whenever the playback buffer is empty
def queueNext(start: Boolean = false) {
  // check if a collection (station or album) is selected
  collection match {
    case Some(col) =>
      val app = getApplication.asInstanceOf[EarbitsApplication]
      // determine if next track should be local or remote
      val local = random.nextDouble > app.getDiscoveryLevel
      // retrieve next track from collection
      col.nextTrack(localMusic, queue.toList, local) onComplete {
        // queue the track
        case Success(Some(t)) => queueTrack(t, start)
```

TABLE 1-continued

Determining Local Or Networked Content

```
      // error handlers
      case Success(None) => Log.w("Failed to queue next track.")
      case Failure(e) =>
        Log.e("Track queue error.")
        Log.e(e)
        EasyTracker.getTracker.sendException("playerService", e, false)
    }
    // attempt to get a station from current track
    case None => currentTrack match {
      case Some(track) => track.artist.bestStation onComplete {
        // set collection to station and restart the queue process
        case Success(Some(station)) =>
          collection = Some(station)
          queueNext(start)
        // error getting station
        case _ => Log.w("No collection.")
      }
      // no current track
      case None => Log.w("No collection.")
    }
  }
}
```

Table 2 provides sample code for, after scanning local media libraries for content, submitting the results of that scan to the server via APIs and receiving the analyzed response from the server. The lines of software code described in this application are merely exemplary. Other similarly suitable commands may be utilized to achieve the same result.

TABLE 2

Submit and Receive Local Content Analysis

```
LocalMusicService.scala
// request an analysis process from the api
def analyze(partial: Boolean): Future[Option[Int]] = future {
  // get a list of local tracks
  getCreateTracks(partial)
  // convert tracks to JSON containing artist name and local id
}.flatMap(tracks => if (!tracks.isEmpty) {
  val json = JsObject(
    "tracks" -> JsArray(tracks.map(_.toAnalysisJson))
  )
  // post track JSON to analysis API
  Http.post(Http.analysisHost +"users/todo/analyze_tracks", json)
    .map(response => if (response.isOK) {
      val obj = response.json.asJsObject
      if (obj.fields.getOrElse("errors", JsFalse).convertTo[Boolean]) {
        Log.e(obj.fields("error_messages").prettyPrint)
        None
      } else
      {
        // receive a process id from API
        Some(response.json.asJsObject.fields("queue_id").convertTo[Int])
      }
    } else {
      Log.e(response)
      None
    })
  // no local tracks, return no id
} else {
  Future(None)
})
// check if API has completed analyzing tracks
def pollAnalysis(queueId: Int, partial: Boolean): Future[Int] = Http.get(
  Http.analysisHost +"workers/"+ queueId
).map(response => if (response.isOK) {
  val json = response.json.asJsObject
  // send analysis results to be recorded in locally
  json.fields.get("response") match {
    case Some(value: JsObject) => {
      recordAnalysis(value, partial)
      -1
    }
```

TABLE 2-continued

Submit and Receive Local Content Analysis

```
    case _ => json.fields("progress").convertTo[Int]
  }
} else {
  throw new Exception("Analysis polling error %d %s".format(
    response.status, response.body
  ))
})
//
  records analysis results locally
def recordAnalysis(response: JsObject, partial: Boolean) {
  // save recommended stations to local file
  val recommendations = response.fields("recommendations")
    .convertTo[List[JsObject]].map(
      _.fields("channel").asJsObject.fields("earbits_id").convertTo[String]
    )
  if (!recommendations.isEmpty) {
    val file = new File(ctx.getCacheDir,
      RECOMMENDATIONS_CACHE)
    if (file.exists) {
      file.delete
    }
    val writer = new PrintWriter(file)
    writer.write(recommendations.toJson.toString)
    writer.close
  }
  // record station best associated with local tracks to database
  deleteTrackStations
  response.fields("songs").convertTo[List[JsObject]].foreach(song => {
    val trackId = song.fields("on_device_id").convertTo[Int]
    song.fields("earbits_station_ids").convertTo[List[String]].foreach
      (stationId => {
        insertTrackStation(trackId, stationId)
      })
  })
  // save unique id representing the current collection of local tracks
  if (!partial) {
    val file =
  mediaVersionFile
    if (file.exists) {
      file.delete
    }
    val writer = new PrintWriter(file)
    writer.write(getVersion)
    writer.close
  }
  // record current time
  ctx.getApplicationContext.asInstanceOf[EarbitsApplication]
    .setLastSuccessfulAnalysisTime( )
}
```

The network devices, network servers and databases, network architecture and communication between these devices are well-known in the art. Data streaming services such as music streaming services are also well-known in the art. The present invention contemplates these well-known devices and architecture in combination with the novel systems and methods of streaming data and especially music described herein.

As used herein, references to "one embodiment" or "an embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims. Additionally, it will be readily apparent to the skilled artisan that in some of the disclosed methods certain steps can be deleted or additional steps performed without affecting the viability of the methods.

The embodiment of the invention in which an exclusive property or privilege is claimed is defined as follows:

1. A method for streaming music from a network server to a network device, the method comprising:

activating a music streaming software application on a network device;

scanning a local media library accessible to the network device to identify a local content media metadata;

submitting the local content media metadata to a network server accessible to the network device;

reading and parsing the local content media metadata file by the network server;

matching artists from the local content media metadata the to a cached artist mapping database found on the network server;

matching artists, for which matches were not found in the cached artist mapping database on the network server, from the local content media metadata file against a database found on a second network server;

updating the network server cached artist mapping database with matching media metadata from the second network server;

retrieving corresponding music genre for each of the matched artists in the cached artist database on the network server;

generating the matched artists to a genre mapping file on the network server;

communicating the genre mapping file to the network device;

creating and displaying channel recommendations on the network device based on the genre mapping file from the network server;

setting a recommended channel based on the genre mapping file on the network device;

prior to generating or updating a playlist based on the recommended channel comprising local and network content, selecting, at least one time, a ratio of local content versus network content for the playlist to a value on the network device thereby creating the playlist on the network device; and starting content playback on the network device based on the ratio of local content versus network content.

2. The method of claim 1, wherein matching artists from the local content media metadata file is done against a cached database located on a plurality of network servers.

3. The method of claim 1, further comprising detecting network conditions and switching to local content as conditions require.

4. The method of claim 3 wherein the detected network conditions comprise determining the bandwidth available to the network device.

5. The method of claim 3 wherein the detected network conditions comprise determining whether the network device is on a cellular network other than the network device's home network.

6. The method of claim 1, wherein the network device is selected from the group consisting of a smartphone, a tablet and a personal computer.

7. The method of claim 1, wherein the playlist is based on metadata from more than one network server.

8. The method of claim 7 wherein an additional network server is queried when the initial network server is not able to identify the music on the network device.

9. The method of claim 1, further comprising communicating between various network devices.

10. The method of claim 9 wherein communication between various network devices comprises exchanging playlists and network parameters.

11. The method of claim 1 wherein a decision to switch to local content is performed on basis of preference setting of the network device.

* * * * *